United States Patent Office 2,733,159
Patented Jan. 31, 1956

2,733,159

BITUMINOUS EMULSION

Baxter I. Scoggin and Homer C. McAninch, Oklahoma City, and Clyde R. Moore, Cyril, Okla., assignors to Anderson-Prichard Oil Corporation, Oklahoma City, Okla., a corporation of Delaware No Drawing. Application May 11, 1951,
Serial No. 225,908

6 Claims. (Cl. 106—277)

This application is a continuation in part of an abandoned application filed by us on May 13, 1948, under Serial No. 26,918, for Surface Coating Compound.

The present invention relates to bituminous dispersion mastic coating-compositions, and particularly to compositions which may be applied with a conventional spray-gun.

The principal object of the invention is to provide a composition which may be safely, easily, and cleanly applied to a surface, and when once applied, will dry rapidly by the evaporation of volatiles, and will thereupon leave a coherent coating which is highly efficient in sound-deadening, insulating, and surface protective action.

The compositions dealt with herein are compounded from aqueous bituminous emulsions, curing agents, thickening agents, and fillers, and are used principally for spray-coating the metal underparts of automotive vehicles, trailers, and railroad cars, and also for coating refrigeration equipment, ventilating and air-conditioning ducts, and other metal objects, including partition surfaces.

The art of sound-deadening, insulating and protecting metal surfaces against corrosion and abrasion, has been highly developed in recent years. However, so far as we have been able to ascertain, all of the prior art compositions for such uses have serious drawbacks.

It is an object of the present invention to provide sprayable coating compositions which are free of flammable petroleum solvents, and which therefore eliminate fire hazard during their application.

It is a further object of our invention to provide bituminous mastic coating compositions which flow readily in ordinary "undercoating" pumps or pressure pots, throughout a wide range of temperature, and which are not subject to pronounced thinning in hot weather and congealing in cold weather. Bituminous-mastic cutbacks, containing petroleum solvents, react detrimentally to normal temperature change.

Another object of our invention is to provide bituminous mastic coating compositions which are readily atomized in a variety of conventional "undercoating" spray guns, and at easily obtainable air pressures, without the gun "slobber" which is commonly met with in spraying, and which will eliminate much of the usual wet mist "kick-back" or "wet-dusting," which is generally encountered in spraying most bituminous materials.

By air atomization as herein used it is intended that the spray-gun be equipped with a source of air under higher than atmospheric pressure, the compressed air mingling with the composition stream in the spray-gun and delivering the resultant composition in very finely divided particles to said surface, rather than in bulk.

Still another object of our invention is to provide compounded bituminous mastic coating compositions, which are stable in storage over long periods of time, without a separation of ingredients by gravity, or a change in homogeneity or consistency.

A particular object of our invention is to make bituminous mastic coating compositions which "cure out" rapidly at ordinary temperatures and ordinary atmospheric humidity, so that the coating is "tack-free" very soon after application, and without baking or forced-drying.

A further and particular object of the invention is to provide bituminous mastic coating compositions, which can be applied to form a uniform thick coating by a single pass of a spray-gun, and which when applied, will build up on a vertical or inclined surface without gravitational flow.

An additional object of our invention is to make compositions which do not shrink or pull away from surface corners or edges, during drying.

A paramount object of our invention is to provide coating which deaden metal vibration by lowering the natural frequency of a vibrating panel, thus decreasing the total volume of sound emitted, and acting on the panel as a sound dampener, thereby shortening the duration of sound vibration.

A prime object of our invention is to provide coatings of the sound deadening type, which are tenaciously adherent to metal objects which are being subjected to vibrations and distortions.

Another principal object of our invention is to provide surface coatings which have the mechanical strength to oppose vibration, and at the same time will remain flexible, particularly at lower temperatures.

Still another principal object of our invention is to provide heat resistant surface coatings of the sound-deadening type, which retain insulating efficiency and absence of flow, at moderately elevated temperatures.

A further object of the present invention is to provide surface coatings of the sound-deadening type, which are also highly abrasion resistant, and highly resistant to the corrosive action of moist atmosphere and water solutions.

Many of the objects accomplished by the present compositions have heretofore been considered as conflicting, by those skilled in the surface coating art. The objects of the present compositions have heretofore often been held to be contradictory, for instance: rapid curing versus fire hazard; ready flow versus storage settling stability; and easy sprayability versus surface deposit thickness build-up.

The novel and unique compositions which are capable of achieving the sum total of the above mentioned objects and purposes, constitute our invention.

In making our invented compositions from aqueous bituminous emulsions, curing agents, thickening agents, and fillers, we employ emulsions of the "mixing" or "slow setting" type—that is, they are sufficiently stable to allow mixing with fine mineral particles, without breakdown. Such emulsions are discussed in Abraham, "Asphalts and Allied Substances," Fifth Edition, volume 2, page 1449; D. Nostrand, Inc., New York, 1945. Emulsion for our purpose must be not more than 5% broken, when subjected to the Cement Mixing Test which is described in "ASTM Standards on Bituminous Materials for Highway Construction, Waterproofing, and Roofing," test designation D 244-42, sections 28 to 32 inclusive; American Society for Testing Materials, Philadelphia, 1948.

Emulsions which can be used in accordance with our invention can be prepared by means well known in the art, exemplified by methods of preparing bituminous emulsions such as are described in U. S. Patent No. 2,074,731 to McKesson; U. S. patents Buckley—2,256,886; Watts and McCoy—2,332,542; Cole and Buckley—2,336,468; Watts—2,412,545; and McCoy—2,412,526.

Emulsions adaptable for our use are of the oil-in-water type. Emulsions having residues of 50 to 70% are preferred. Emulsions of viscosity 35 to 80 furol seconds at 77° F. (ASTM, loc. cit., test designation D244-42, sections 3 and 4), are preferred for our invention.

The bituminous emulsions for our inventive compositions are preferably made from asphaltic bitumen; although other bitumens such as petroleum pitch, coal tar pitch or stearine pitch, may be substituted for or blended with asphalt, asphalt emulsion is preferred.

Emulsions of relatively soft bitumens (ball and ring softening point less than 150° F., penetration at 77° F. less than 100 according to ASTM, loc. cit., test designations D-36-26, and D5-47T) which on coagulation by evaporation of volatiles readily form a coherent continuous layer of bitumen, are preferred for our invention.

As it is advantageous to have applied coatings dry to touch as soon as practicable, an evaporation accelerator is part of our inventive compositions. We have found that water-soluble, highly volatile substances such as carbon doxide, formaldehyde, acetaldehyde, methanol, ethanol, acetone and methyl ethyl ketone increase the drying rate of mixing-type bituminous emulsions. By varying the proportion of such ingredients of high evaporation rate, and by varying the proportion of water, the air exposed drying time of a filled or unfilled emulsion surface may be adjusted as desired, to range from a few minutes to several hours duration.

We have discovered that methanol or ethanol not only accelerate the drying rate of our compositions, but after complete curing the coatings have better adhesion, better flexibility, more resilience and incur less shrinkage than the compositions containing the same ingredients minus the methanol or ethanol. Methanol or ethanol are preferred curing agents in our invention, and methanol is particularly preferred for commercial use, because more readily available.

Our inventive compositions contain thickening agents. By thickening agents we mean water-dispersible mineral or organic substances which increase the viscosity of oil-in-water type emulsions by a water-imbibing swelling action or gel-formation. We have found that the choice and proportioning of thickening agents in our bituminous dispersion mastic coating compositions is a highly important factor in determining the value of the compositions.

Thickening agents are incorporated in our compositions to make them thick enough to prevent settling of fillers during storage, and likewise to prevent run-off of freshly applied coatings of appreciable thickness. In attaining these purposes, ingenuity must be exercised to have a composition which is not too thick to slump readily in pressure pots, or to flow freely in spraying pumps and in spray guns. A thickening agent of the thixotropic type, such as bentonite, serves these purposes to a moderately satisfactory degree when correctly proportioned in our compositions. The presence of bentonite causes the composition to remain gel-like when undisturbed, to thin immediately upon agitation, and to again thicken immediately, when agitation is discontinued. A thixotropic thickening agent allows easy material pick-up by pump action or pressure-forcing to a spray gun, even through long lengths of hose, and allows easy atomization to a thick coating which will remain where it is sprayed. Also spray gun "slobber" is absent from our composition, since the material thickens and ceases to run as soon as agitation and pressure are cut off.

The viscosity-gel-flow properties obtained by appropriately proportioned swelling clay in our compositions, are almost perfect for application purposes. We have discovered, however, that the use of swelling clay as the sole thickening agent is attended by disadvantages in certain special cases, and trial applications proved that our swelling clay-thickened compositions "seemed" too "heavy." This would constitute a serious problem in obtaining the acceptance of the product by the coating trade. Other trial applications proved that the swelling-clay-thickened compositions had a slight tendency to re-emulsify, if simultaneously exposed to water and to abrasive action shortly after application. For example, when a freshly "undercoated" auto was immediately driven over a wet, sandy or gravelly road, re-emulsification would occur. In experimenting to overcome this undesirable tendency, it was discovered that certain proportions of non-thixotropic thickening agents were beneficial. It was discovered that thickening agents, such as sodium carboxy methyl cellulose or cellulose methyl ether, had the combined effect of making the compositions simultaneously less "heavy" appearing, and less liable to re-emulsification after application and before drying. Apparently the cellulosic compounds partly "tenderized" the tough bentonite gel, and at the same time, they caused the coating to rapidly "skin-over" after deposition, and to form a water-resistant film. In merchandising the commodity of our invention, compositions thickened by bentonite only, and compositions thickened by bentonite plus a cellulose derivative, are compounded for fulfilling different coating requirements.

Fillers in our compositions are of two types, that is, fibrous and powdered. We have carried out experimental work with fibrous fillers of all known types— long and short asbestos fibers, glass wool, mineral wool, and organic fibers (wood fibers, cellulosic linters). Asbestos fibers have proven most practical for our product, with glass wool as second choice.

Asbestos fibers have been found to be most desirable in our compositions to obtain thick resilient protective coatings of great durability, which resist flow at high temperatures, and are elastic at low temperature. It is believed that the virtue of asbestos fibers lies in the formation of an internal skeleton structure in the coatings, and this structure when fortified by thickening agents and bound by bitumen, forms a coating which is unaffected by actinic or oxidation "aging," and has the ability to withstand small permanent stresses such as are set up by gravity on sloping surfaces (at high or low temperatures), or small distortion stresses from vibration, and at the same time, the coating is able to yield enough to allow deformations of the base to which it is applied. Other fibers may serve our purpose as well, but asbestos fibers are preferred, partly on the score of standardized uniformity and proven durability.

Powdered bodying agents are incorporated in our invented compositions to increase abrasion resistance in the coatings, and also to "dry out" overspray in application. We believe the abrasion resistance increase accomplished by powdered bodying agents, is due to filling-in the fiber-thickening agent skeleton, and thereby giving mechanical support to the skeleton which is greater than the support furnished by a bitumen binder alone. Whatever the mechanical action may be, we have found that powdered fillers are valuable additions to our fibrous-filled bituminous compositions, and therefore, we do not wish to be limited by any theoretical explanation.

Respecting the elimination of overspray in connection with our product, we have discovered that atomizing kick-back, commonly experienced with most kinds of sprayed coatings, can be reduced to a dry dust by incorporating powdered agents at appropriate proportions in our invented compositions. We cannot explain this effect, but it is highly important to applicator-comfort and cleanliness of spray premises. Diatomaceous earth, or ground mica, are our preferred powdered bodying agents.

So far, hereinabove, little has been said as to the proportioning of the ingredients in our inventive compositions. Two important points are, however, tied closely to proportioning. One is the economically important problem of rapid single-pass application of a coating at a uniform desired thickness. This is fundamentally a question of fixing the solids and volatiles ratio in the compositions. Appropriate solids and volatiles proportioning is illustrated in the examples given hereinbelow.

The second important point connected with proportioning is that of achieving the ultimate in flexibility and elasticity (freedom from brittleness; shock resistance, and low temperature susceptibility), combined with durability. This problem of maximizing pliancy and durability is basically one of determining the best filler and binder ratio. Suitable filler and binder ratios are exemplified hereinbelow.

The following examples are given to illustrate our invention. It is not intended that the broad invention herein disclosed be limited to any of the specific details given in these illustrative examples.

*Example 1*

A mixing type emulsion was prepared by milling together:

31,000 lbs. asphalt
17,000 lbs. soft water
1,000 lbs. Vinsol resin
250 lbs. potassium hydroxide
100 lbs. sodium dichromate and held in a tank for dispensing.

A slurry was made up by agitating in a mixing vessel:

1,700 lbs. methanol
1,640 lbs. soft water
600 lbs. Wyoming bentonite
1,100 lbs. Canadian asbestos fibers, and
11,480 lbs. of the above emulsion then run in with stirring, followed by stirring in
400 lbs. powdered diatomaceous earth and thorough mixing by a homogenizer, then packaging in finished product drums Consistency uniformity tests carried out during packaging showed all drums to be in the range 365/373 light cone penetration at 77° F. The cone penetration test procedure is ASTM test designation D 217-48 (ASTM Standards on Petroleum Products and Lubricants; American Society for Testing Materials, Philadelphia, 1950) except that the sample is tested in a tin ointment box measuring approximately 2.5 inches deep by 3.75 inches diameter and is worked by stirring immediately before testing. When measuring light cone penetration, the standard grease cone is replaced by a plastic cone such that the total moving weight is approximately 62 grams.

Tests for product particle size, made by dilution with water and pouring through a United States standard sieve, showed less than 0.2 gram retained on a #10 sieve per gallon of product.

The product was found not to have flash or fire points as are observed with most petroleum products. In fact, a blow torch flame was played into an open barrel of the product, and into the spray from a spray gun, without any observable flash effect.

Storage stability tests on the product showed 10 to 15 decimillimeters increase in light cone penetration at 77° F. within the first 24 hours after manufacture, and not over 12 dmm. further change in consistency during an additional seven months' storage in closed drums.

Spray-out tests on the product, through undercoating pump and gun showed:

*Material pressure.*—40 p. s. i. g. to 60 p. s. i. g.
*Atomizing pressure.*—60 p. s. i. g. to 80 p. s. i. g.
*Pattern.*—Uniform from middle to limit of cone.
*Build-up on vertical surface.*—⅛ inch without run-off or sagging.
*Spraying slobber.*—None.
*Spraying kick-back, fogging, misting.*—None.
*Drying time.*—2 hours (dry to touch).
*Resistance to re-emulsification.*—After 18 hours' air curing of a ⅛ inch film of the composition on metal, vigorous rubbing with a wet finger resulted in a light, brown stain on the finger.

*Shrinkage.*—A ⅛ inch film of the composition applied to the inside of a right angle bend in a steel panel, then air cured four hours and oven cured 18 hours at 140° F. showed uniform shrinkage around the bend with no pulling away from the metal or cracking at the apex of the angle.

Coated panel tests on the product at 1/16 inch thickness on 1/16 inch steel panel, air-cured 100 hours, showed:

*Abrasion resistance.*—Using the test procedure ASTM D-658 (ASTM Standards 1946; American Society of Testing Materials, Philadelphia, 1946), a commercial testing laboratory reported an abrasion loss of 0.012 grams after 1000 seconds' exposure.

*Corrosion resistance.*—After being subjected to standard salt spray test for 48 hours the coating maintained 100% adhesion to the panel and there was no evidence of corrosion beginning under the coating.

*Thermal flow.*—When suspended vertically for 24 hours at 325° F. the coating did not flow, sag or creep.

*Durability.*—Coating of this composition and thickness had previously been found to last at least 4 years on outdoor exposure and at least 10,000 kilowatt hours on weatherometer, with no alligatoring, no cracking to panel, no panel corrosion or other failure.

Coated panel tests on the product at special thicknesses showed:

*Sound-deadening.*—At application rate of 0.5 lb./sq. ft., a commercial testing laboratory found the product to have a decay rate of 6.8 db./sec. at 70° F.

*Thermal conductivity.*—K factor of the product was found by a commercial testing laboratory to be 1.27 B. t. u./hr./sq. ft./°F.

*Water vapor permeability.*—Determined to be 2.18 grams $H_2O$ per 100 square inches per 24 hours using procedure described in Army Air Forces Specification No. 14151; "Compound; Water and Moisture Proof, Package Coating," Amendment No. 1, December 3, 1945; Army Air Forces, Headquarters, Air Techanical Service Command, Wright Field, Dayton, Ohio.

*Adhesion and flexibility.*—A comparison mastic was made up using the same ingredients and proportions as given in the example but omitting methanol. Coatings of Example 1 product and the comparison mastic were each applied ⅛ thick to steel panels, air-cured, then baked for 30 hours at 220° F. After then cooling to room temperature, the panels were bent rapidly (in 1 second) around a ¼ inch diameter metal rod and inspected. The Example 1 product coating was found to have slight surface cracks (only), and to remain adherent to the panel. The comparison mastic was cracked throughout the coating and separated from the metal over the entire area subjected to flexure.

*Example 2*

In a paddle-type mixing vessel, a well-mixed slurry was made up from:

1,700 lbs. methanol
1,640 lbs. soft water
300 lbs. Wyoming bentonite
25 lbs. sodium carboxymethyl cellulose high viscosity grade
1,100 lbs. Canadian asbestos fibers, and
13,380 lbs. of 63% residue mixing-type bituminous emulsion, similar to that in Example 1, stirred in, followed by addition of
400 lbs. powdered diatomaceous earth, and homogenizing; then packaging.

This product had light cone penetrations at 77° F. between 335 and 346 during packaging.

All product and applied coating property tests were substantially identical with Example 1 product and applied coating tests, except that re-emulsification did not occur to any detectable degree upon finger-rubbing the coating under water, and the composition was more "fluid-like" in the drum.

Example 3

A well-mixed slurry was prepared from:

250 lbs. methanol
4,100 lbs. soft water
300 lbs. Wyoming bentonite
25 lbs. sodium carboxymethyl cellulose, high viscosity grade
1,100 lbs. Canadian asbestos fibers, and
12,800 lbs. of approximately 63% residue mixing type bitumen emulsion similar to that in Example 1 stirred in, followed by addition of
400 lbs. powdered diatomaceous earth, and homogenizing, then packaging.

This product consistency was 345 to 347 light cone penetration at 77° F.

All product and applied coating property tests were substantially identical with those of Example 2, except that coating drying time to touch was close to three hours instead of two hours, and cracks were somewhat deeper with slight separation from panel in the adhesion-flexibility test.

Example 4

An especially rapid-drying water-resistant protective coating was desired, for applying to the walls of a cold-storage vault.

A well-mixed blend of 70 lbs. methanol
16.5 lbs. bentonite
30 lbs. asbestos fibers
373 lbs. mixing type 64% residue bituminous emulsion
11 lbs. powdered diatomaceous earth was made up and served admirably.

The consistency of this material was 324 light cone penetration at 77° F.

Tack-free drying time was 25 minutes. The applied coating, approximately 1/16 inch in thickness, has stood up for approximately two years, with no sign of deterioration.

Example 5

To fill a need for a rapid-drying sound-deadening protective coating for application free of fire hazard to metal panels on an assembly line basis, another special formula embodying our invention was made, a thoroughly intermixed composition of:

180 lbs. methanol
19 lbs. bentonite
1.6 lbs. sodium carboxymethyl cellulose
69 lbs. asbestos fibers
676 lbs. mixing type 62.5% residue bituminous emulsion
25 lbs. powdered diatomaceous earth This product had a light cone penetration at 77° F. of 332.

Tack-free drying time was 15 minutes. Assembly-line application (without using any masking tape) was reported as remarkably easy. The coating has been very satisfactory in passing laboratory vibration, adhesion, and flexibility tests, and is expected to give years of sound-deadening service, replacing tediously glued-on felt board deadeners formerly used.

Example 6

In order to prepare a thick-coat mastic for sound-deadening, heat insulation, and protection for sheet iron buildings, a homogenized composition was made of:

52 lbs. methanol
47 lbs. water
25 lbs. bentonite
37 lbs. asbestos fibers
328 lbs. mixing-type 64% residue bituminous emulsion
12 lbs. powdered diatomaceous earth.

The material, as prepared, had a light cone penetration consistency at 77° F. of 245. It was found to build-up readily on a vertical surface to ½ inch without sag or flow. Coatings from this composition have been under test through extreme summer weather and moderately cold winter weather, applied to both the interior and to the exterior of galvanized iron sheet structures. It has been established that the combination of an exterior reflective paint and interior insulation by our composition coating is extremely effective in reducing inclosure temperatures during summer. Likewise, the coating has been found to help retain inclosure heat in a sheet metal building during winter.

Example 7

To determine the effect of thickening entirely by cellulosic agent, a laboratory mill blend was made up from:

5.00 lbs. methanol
4.70 lbs. soft water
0.15 lbs. sodium carboxymethyl cellulose
3.80 lbs. asbestos fibers
35.00 lbs. 63% residue mixing type emulsion
1.20 lbs. powdered diatomaceous earth.

This preparation was of consistency 315 light cone penetration at 77° F. Comprehensive spraying and applied coating tests were carried out on the material, and it was found to be substantially equal to the Example 2 product in all observed properties.

The compositions of our examples are calculated and tabulated here for convenience:

| Example No. | Bitumen plus emulsifying chemicals, percent | Methanol, percent | Water, percent | Swelling clay thickeners, percent | Cellulosic thickener, percent | Fibrous filler, percent | Powdered bodying agent, percent |
|---|---|---|---|---|---|---|---|
| 1 | 44.48 | 10.05 | 33.06 | 3.55 | 0.00 | 6.50 | 2.36 |
| 2 | 45.46 | 9.17 | 35.53 | 1.62 | 0.13 | 5.93 | 2.16 |
| 3 | 42.50 | 1.32 | 46.56 | 1.58 | 0.13 | 5.80 | 2.11 |
| 4 | 47.69 | 13.99 | 26.82 | 3.30 | 0.00 | 6.00 | 2.20 |
| 5 | 43.53 | 18.55 | 26.12 | 1.96 | 0.16 | 7.10 | 2.58 |
| 6 | 42.11 | 10.38 | 32.73 | 4.99 | 0.00 | 7.39 | 2.40 |
| 7 | 44.23 | 10.03 | 35.41 | 0.00 | 0.30 | 7.62 | 2.41 |

It may be noted that we have "held" the mixing type bituminous emulsion used practically constant in order to better bring out the novel elements in our invention. It is obvious, however, that mixing-type emulsions of higher or lower residue could be utilized, by virtue of the water content desired in the finished product, except in the case of a most rapidly drying composition. We have readily applied our invention to mixing type emulsions of high and of low residue. Also, we have incorporated mixing type emulsions of different chemical compositions in our invention. For instance, mixing type emulsions made up from:

60 to 68% bitumen
1% Vinsol resin
0.2% potassium hydroxide
0.1% sodium phosphate
Balance soft water have been found to be appropriate for our invention.

Ranges of ingredients are:                      Percent
Bitumen _____ 50–70
Emulsifying chemicals _____ 0.1–10
Evaporation accelerator _____ 1–40
Thickening agent _____ .15–10
Fiber _____ 5–12
Mineral filler _____ 2–6

Bitumens of all well-known varieties have been investigated for preparing usable emulsions—including blends of bitumens and oils. Our preference, as stated hereinabove was arrived at by charting and interpolating resultant properties.

The order of blending ingredients with emulsion (implied in Example 1) has been found by trial to be not critical to our invention.

The composition of our examples, as weight-percent of the weight of emulsion used are calculated and tabulated here for convenience and clarity.

| Exam. No. | Bitumen and emulsifying chemicals, percent | Methanol, percent | Water, percent | Swelling clay thickener, percent | Cellulosic thickener, percent | Fiber, percent | Powdered bodying agent, percent |
|---|---|---|---|---|---|---|---|
| 1 | 65.6 | 14.8 | 48.7 | 5.2 | 0.0 | 9.6 | 3.5 |
| 2 | 63.0 | 12.7 | 49.3 | 2.2 | 0.2 | 8.2 | 3.0 |
| 3 | 63.0 | 2.0 | 69.0 | 2.3 | 0.2 | 8.6 | 3.1 |
| 4 | 64.0 | 18.8 | 36.0 | 4.4 | 0.0 | 8.0 | 2.9 |
| 5 | 62.5 | 26.6 | 37.5 | 2.8 | 0.2 | 10.2 | 3.7 |
| 6 | 64.0 | 15.9 | 50.3 | 7.6 | 0.0 | 11.3 | 3.7 |
| 7 | 63.0 | 14.3 | 50.5 | 0.0 | 0.4 | 10.9 | 3.4 |
| Range | 62.5/65.6 | 2.0/18.8 | 36.0/69.0 | 0/7.6 | 0/.4 | 8.0/11.3 | 2.9/3.7 |
|  |  |  |  | 0.4/7.6 |  |  |  |

Our investigation of thickening agents has taken in swelling clays from all known sources and cellulosic materials of all domestic manufacturers; the agents used in the examples are believed to exemplify our invention sufficiently.

Although our examples give only asbestos fiber filler and diatomaceous earth as bodying agents, our research has included testing of hundreds of bituminous mastics containing bodying agents and fillers of all kinds—cork, Styrofoam, slate dust, mineral clays from all over the United States—sand from several sources, wood fibers, glass fibers, mineral wool fibers, Perlite, Vermiculite, pumice, barium carbonate, barium sulfate, ground micaceous minerals, ground purified mica, carbon blacks and others. Our selections of fibrous fillers and fine granular bodying agents are well-founded.

It may be commented that products formulated as in Examples 1, 2 and 3 have been turned out in over 6,600,000 lbs. quantity without significant variation in performance. Products represented by the first six examples have received other uses than those mentioned earlier; for instance as granule adhesive base and for decorative purposes. The coatings may be painted over readily. Also, our invented compositions may be sprayed directly on to hot surfaces—as hot as 300° F.—with perfect results. This is an advantage when applying insulative and protective coatings to hot gas ducts and the like, where it is inconvenient to cool the surface.

Our invented compositions deposit flexible coatings which are tenaciously adherent to dry or damp solid surfaces of all kinds: bare or painted metals, masonry, wood, glass, and to solid or quasi-solid plastics.

Having described our invention and the advantages thereof, it will be evident to those skilled in the art that numerous changes or modifications may be made therein, without departing from its scope as defined in the appended claims.

What we claim is:

1. A composition for air atomizing and spray-depositing on a surface thereby producing a flexible and adhesive and non-tacky coating thereon, the combination of: a slow setting type bituminous emulsion containing not under 50 percent and not over 70 percent by weight of bitumen, and containing not less than 0.1 percent nor over 10 percent by weight of emulsifying chemicals, the balance of said emulsion being water of not under 25 percent nor over 49 percent; an aliphatic water-soluble evaporation acceleration compound boiling below 100° C., and containing no other element than carbon, hydrogen, and oxygen, in quantity not under 1 percent nor over 40 percent of the weight of emulsion; a water dispersible thickening agent in quantity not under 0.15 percent nor over 10 percent of the weight of the emulsion; fiber in quantity not under 5 percent nor over 12 percent of the weight of the emulsion; and a finely ground granular mineral filler in quantity not under 2 percent nor over 6 percent of the weight of the emulsion, said ingredients being mixed within the said ranging proportions to produce a thixotropic slurry adapted to and capable of atomization and spray-gun deposition.

2. A composition as in claim 1 in which the water soluble evaporation accelerator is methanol.

3. A composition as in claim 1 in which the water-dispersible thickening agent is bentonite.

4. A composition as in claim 1 in which the water-dispersible thickening agent is a mixture of bentonite and sodium carboxy methyl cellulose.

5. A composition as in claim 1 in which the fiber is asbestos fiber.

6. A composition as in claim 1 in which the finely ground granular filler is diatomaceous earth.

References Cited in the file of this patent

UNITED STATES PATENTS

| 1,461,445 | Kirschbraun | July 10, 1923 |
| 1,602,105 | Geer | Oct. 5, 1926 |
| 1,796,269 | Rose | Mar. 10, 1931 |
| 2,022,229 | Bray | Nov. 26, 1935 |
| 2,029,289 | Bray | Feb. 4, 1936 |
| 2,385,437 | Fasold et al. | Sept. 25, 1945 |
| 2,393,574 | Sommer | Jan. 22, 1946 |
| 2,412,526 | McCoy | Dec. 10, 1946 |
| 2,416,134 | Allen | Feb. 18, 1947 |
| 2,431,891 | Rosencrause | Dec. 2, 1947 |
| 2,597,872 | Iler | May 27, 1952 |

FOREIGN PATENTS

| 632,881 | Great Britain | Dec. 5, 1949 |
| 596,714 | Great Britain | Jan. 9, 1948 |
| 653,285 | Germany | Nov. 19, 1937 |